United States Patent [19]
Kissin

[11] Patent Number: 6,015,766
[45] Date of Patent: Jan. 18, 2000

[54] CATALYST SYSTEMS FOR OLEFIN POLYMERIZATION BASED ON METALLOCENE COMPLEXES AND OLIGOALKYLALUMINATES WITH STERICALLY HINDERED ALKYL GROUPS AS COCATALYSTS

[75] Inventor: Yury V Kissin, East Brunswick, N.J.

[73] Assignee: Mobil Oil Corporation, Fairfax, Va.

[21] Appl. No.: 08/993,167

[22] Filed: Dec. 18, 1997

[51] Int. Cl.[7] .............................. B01J 31/00; B01J 37/00; C08F 4/02; C08F 4/60
[52] U.S. Cl. ..................... 502/103; 502/111; 502/117; 502/125; 175/179; 175/182
[58] Field of Search ...................... 502/103, 111, 502/117, 125; 556/175, 176, 179, 181, 182

[56] References Cited

U.S. PATENT DOCUMENTS

| | | | |
|---|---|---|---|
| 2,744,074 | 5/1956 | Theobald | 260/2 |
| 2,979,497 | 4/1961 | Rinse | 260/97.5 |
| 5,258,475 | 11/1993 | Kissin | 526/129 |
| 5,326,837 | 7/1994 | Kissin | 526/150 |
| 5,391,793 | 2/1995 | Marks et al. | 556/179 |
| 5,397,757 | 3/1995 | Mink et al. | 502/115 |
| 5,506,184 | 4/1996 | Kissin et al. | 502/115 |
| 5,550,094 | 8/1996 | Ali et al. | 502/115 |
| 5,777,143 | 7/1998 | Malpass et al. | 556/179 |
| 5,831,109 | 11/1998 | Smith et al. | 556/179 |
| 5,847,177 | 12/1998 | Sangokoya et al. | 556/179 |
| 5,849,653 | 12/1998 | Dall'Occo et al. | 502/111 |
| 5,895,771 | 4/1999 | Epstein et al. | 556/182 |
| 5,939,346 | 8/1999 | Marks et al. | 502/125 |

FOREIGN PATENT DOCUMENTS

| | | | |
|---|---|---|---|
| 0 279 586 A2 | 8/1988 | European Pat. Off. | |
| 58-85830 | 5/1983 | Japan | |
| 4-266891 | 9/1992 | Japan | |
| WO 94/10180 | 5/1994 | WIPO | 556/179 |

OTHER PUBLICATIONS

PCT International Searh Report, Nov. 17, 1998 (mailed) PCT/US98/24443.

*Primary Examiner*—Mark L. Bell
*Assistant Examiner*—J. Pasterczyk
*Attorney, Agent, or Firm*—Lori F. Cuomo; Dennis P. Santini

[57] ABSTRACT

The invention relates to catalyst compositions for olefin polymerization comprising metallocene complexes and novel cocatalysts belonging to the group of oligoalkylaluminates with sterically hindered alkyl groups, such as a triphenylmethyl group. These cocatalysts are produced by two alternative synthetic methods, either by reacting methylalumoxane with a sterically hindered carbinol such as triphenyl carbinol; or in two-step processes comprising first reacting trimethylaluminum with said carbinol and then reacting the products of the first step with water. Catalyst systems containing these cocatalysts and metallocene complexes are active in polymerization and copolymerization reactions of ethylene and alpha-olefins.

16 Claims, No Drawings

CATALYST SYSTEMS FOR OLEFIN POLYMERIZATION BASED ON METALLOCENE COMPLEXES AND OLIGOALKYLALUMINATES WITH STERICALLY HINDERED ALKYL GROUPS AS COCATALYSTS

FIELD OF THE INVENTION

The invention relates to new catalyst compositions for olefin polymerization reactions. In particular, the invention relates to new cocatalysts for activating metallocene complexes of transition metals as olefin polymerization catalysts.

BACKGROUND OF THE INVENTION

Catalyst compositions comprising metallocene complexes activated by alkylalumoxane activators (or cocatalysts), were introduced to the art of polymerization catalysis in the mid-1970s. Alkylalumoxanes exhibit several inherent problems in use, such a need for high [alumoxane]:[metallocene] ratios to produce highly active catalyst compositions, highly reactivity toward impurities (moisture, alcohols, etc.) and flammability. Accordingly, some of the developments in this area of catalysis involved a search for alternative cocatalysts capable of activating metallocene complexes.

The class of alkylalumoxanes comprises oligomeric linear and/or cyclic compounds represented by the formulas $R-[Al(R)-O]_n-AlR_2$ for linear oligomeric alumoxanes and $[-Al(R)-O-]_n$ for cyclic oligomeric alumoxanes where R is a $C_1-C_8$ alkyl group. If R is the methyl group, the compound is called methylalumoxane or MAO. MAO has been the most widely used cocatalyst in metallocene catalyst systems.

It is an object of this invention to obviate the use of MAO as a cocatalyst for metallocene complexes.

SUMMARY OF THE INVENTION

The invention relates to catalyst compositions for olefin polymerization comprising metallocene complexes and alkylaluminate cocatalysts. The catalyst composition may be homogeneous catalysts or supported heterogeneous catalysts which take the form of free flowing particles which comprise an activated metallocene catalyst.

The cocatalysts of this invention for metallocene complexes are oligomeric alkylaluminates which can be represented by the formula $[-Al(CH_3)-O]_p-[-Al(OR)-O-]_q$ where R is a strongly sterically hindered alkyl group derived from a carbinol and where the p:q ratio can vary from 10:1 to 0:1. These cocatalysts are produced either by reacting MAO with strongly sterically hindered carbinols or by reacting trimethylaluminum, in sequence, with a sterically hindered carbinol and with water. Catalyst systems containing these cocatalysts and metallocene complexes are active in polymerization and copolymerization reactions of ethylene and alpha-olefins. Contact of the alkylaluminate cocatalyst and the metallocene complex can occur prior to, or concurrently with, introduction of the metallocene complex into a polymerization reactor.

DETAILED DESCRIPTION OF THE INVENTION

Metallocene complexes in the catalyst compositions of the invention have the formula $Cp_xMA_yB_z$ in which Cp is an unsubstituted or substituted cyclopentadienyl group, M is zirconium, titanium or hafnium and A and B belong to the group including a halogen atom, a hydrogen atom or an alkyl group. In the above formula of the metallocene compound, the preferred transition metal atom M is zirconium. In the above formula of the metallocene compound, the Cp group is an unsubstituted, a monosubstituted, disubstituted or a polysubstituted cyclopentadienyl group: and x is at least 1 and preferably is 2. The substituents on the cyclopentadienyl group can be preferably linear or branched $C_1-C_6$ alkyl groups. The cyclopentadienyl groups can also be a part of a bicyclic or a tricyclic moiety such as indenyl, tetrahydroindenyl, fluorenyl or a partially hydrogenated fluorenyl group, as well as a part of other substituted bicyclic or tricyclic moieties. In the case when x is equal to 2, the cyclopentadienyl groups can be also bridged by polymethylene or dialkylsilyl groups such as $-CH_2-$, $-CH_2-CH_2-$, $-CR'R''-$ and $-CR'R''-CR'R''-$ where R' and R'' are small alkyl or phenyl groups or hydrogen atoms, $-Si(CH_3)_2-$, $-Si(CH_3)_2-CH_2-CH_2-Si(CH_3)_2-$, and similar bridge groups. If the A and B substituents in the above formula of a metallocene compound are halogen atoms, they belong to the group of fluorine, chlorine, bromine or iodine; and y+z is 3 or less, provided that x+y+z equals the valance of M. If the substituents A and B in the above formula of the metallocene compound are alkyl groups, they are preferably linear or branched $C_1-C_8$ alkyl groups, such as methyl, ethyl, n-propyl, isopropyl, n-butyl, isobutyl, n-pentyl, n-hexyl or n-octyl.

Suitable metallocene compounds include:
bis(cyclopentadienyl)metal dihalides,
bis(cyclopentadienyl)metal hydridohalides,
bis(cyclopentadienyl)metal monoalkyl monohalides,
bis(cyclopentadienyl)metal dialkyls,
bis(indenyl)metal diahalides,
bis(tetrahydroindenyl)metal dihalides, and
bis(fluorenyl)metal dihalides,
wherein the metal is titanium, zirconium or hafnium, halide atoms are preferably chlorine and the alkyl groups are $C_1-C_6$ alkyl groups. Illustrative but nonlimiting examples of metallocene complexes include
bis(cyclopentadienyl)zirconium dichloride,
bis(cyclopentadienyl)titanium dichloride,
bis(cyclopentadienyl)hafnium dichloride,
bis(cyclopentadienyl)zirconium dimethyl,
bis(cyclopentadienyl )hafnium dimethyl,
bis(cyclopentadienyl)zirconium hydridochloride,
bis(cyclopentadienyl)hafnium hydridochloride,
bis(n-butylcyclopentadienyl)zirconium dichloride,
bis(n-butylcyclopentadienyl)(hafnium dichloride,
bis(n-butylcyclopentadienyl)zirconium dimethyl,
bis(n-butylcyclopentadienyl)hafnium dimethyl,
bis(n-butylcyclopentadienyl)zirconium hydridochloride,
bis(n-butylcyclopentadienyl)hafnium hydridochloride,
bis (1,3-dimethylcyclopentadienyl)zirconium dichloride,
bis(pentamethylcyclopentadienyl)zirconium dichloride,
cyclopentadienylzirconium trichloride,
bis(indenyl)zirconium dichloride,
bis(4,5,6,7-tetrahydro-1-indenyl)zirconium dichloride, and
ethylene[bis(4,5,6,7-tetrahydro-1-indenyl)]zirconium dichloride.

In the catalyst compositions of the invention, one or several of these metallocene complexes are contacted with an alkylaluminate cocatalyst containing strongly sterically hindered alkyl groups. These cocatalysts are oligomeric products which can be represented by the formula $[-Al(CH_3)-O]_p-[-Al(OR)-O-]_q$ where R is a sterically hindered alkyl group containing at least three carbon atoms and where the q:p ratio varies from 1:10 to 1:0.

Sterically hindered alkyl group is defined in the context of this invention as a group containing a trisubstituted aliphatic carbon atom, —CR'R"R"', or a disubstituted aliphatic carbon atom, —CHR'R", where substituents R', R" and R"' are the same or different aliphatic, aromatic or alkylaromatic groups such as methyl, ethyl, propyl, isopropyl, isobutyl, tert-butyl, phenyl, alkyl-substituted phenyl, benzyl groups, etc. Groups R', R" and R"' can also form a cyclic entity such as in adamantane, substituted adamantane, norbornane, a substituted norbornane, etc. The preferred sterically hindered alkyl groups of this invention are the triphenylmethyl group, diphenylmethyl group, 1-adamantyl group, 2-adamantyl group, 2-norbornyl group, and 2-(1,3,3-trimethyl) norbornyl group. A sterically hindered carbinol is defined in the context of this invention as an alcohol containing a trisubstituted aliphatic carbon atom or a disubstituted aliphatic carbon atom in the alpha-position to its hydroxyl group, R'R"R"'COH or R'R"HCOH, where substituents R', R" and R"' are the same as in sterically hindered alkyl groups described above. Illustrative but nonlimiting examples of the sterically hindered carbinols include triphenyl carbinol, diphenyl carbinol, tert-butanol, 1-adamantanol, 2-adamantanol, endo- and exo-norborneols, and fenchyl alcohol (1,3,3-trimethyl-2-norbornanol).

These oligomeric cocatalysts are produced by any of two alternative synthetic methods. In the first method, the cocatalysts are produced by reacting MAO with a sterically hindered carbinol.

The reaction between MAO and any of the said carbinols can be carried out in solution in any nonpolar solvent, such as a paraffinic hydrocarbon, a cycloalkane or an aromatic hydrocarbon, in a broad range of temperatures, from sub-zero to elevated temperatures. The optimum reaction temperatures are from 10 to 70° C. The reaction proceeds vigorously with the formation of methane. It can be assumed that the reaction can be described by the following equation:

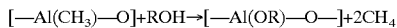

If an excess of the carbinol is used for the cocatalyst synthesis, it can be neutralized in a post-reaction with trimethylaluminum (TMA). The products of the post-reaction, aluminum alkoxides $(CH_3)_2Al(OR)$, $(CH_3)Al(O—R)_2$, etc., are, by themselves, inert in the polymerization reactions.

The second method for producing cocatalysts of this invention consists of two consecutive stages. In the first stage, the said carbinol is reacted with TMA. The reaction can be carried out in solution in a nonpolar solvent, such as a paraffinic hydrocarbon, a cycloalkane or an aromatic hydrocarbon, in a broad range of temperatures, from sub-zero to elevated temperatures. The optimum reaction temperatures are from 10 to 70° C. The reaction proceeds vigorously with the formation of methane. It can be assumed that the reaction can be described by the following equations:

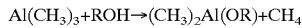

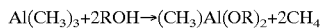

and produces methylaluminum alkoxides. The ratios between $Al(CH_3)_3$ and the carbinol can vary from 1:1 to 1:2.

In the second stage of the preparation of the cocatalyst, the product of the first stage is contacted with water. This stage of the reaction can also be carried out in a broad range of temperatures, from sub-zero to elevated temperatures. The optimum reaction temperatures are from 10 to 70° C. The reaction is relatively slow and requires, depending on temperature, from 15 to 60 minutes to come to completion. It can be monitored by observing a slow disappearance of drops of water on the bottom of the reaction vessel. The total amount of water can be added to the reaction vessel in one step or in several consecutive steps. It is believed that these reactions proceed as shown:

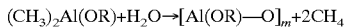

Depending on the ratio between $Al(CH_3)_3$ and said carbinol in the first stage of the catalyst synthesis and the ratio between the products of the first stage and water, this method produces compounds which can be represented by the formulas:

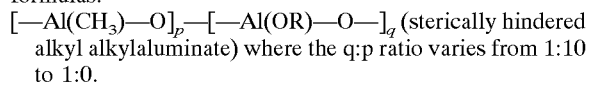 (sterically hindered alkyl alkylaluminate) where the q:p ratio varies from 1:10 to 1:0.

The catalyst compositions of the invention can contain sterically hindered alkylaluminates and metallocene complexes in the molar $[Al]_{aluminate}:[M]_{metallocene}$ ratio ranging from 20,000 to 1.0, preferably from 5,000 to 100.

The catalyst compositions may be formed prior to their introduction into a polymerization reactor or in situ in the reactor by contacting the aluminate with metallocene complex. If the catalyst composition is supported, the support may be contacted with the aluminate to form the first contact product and then with the metallocene complex to form the second contact product; or the support can be contacted with the metallocene complex and then with the aluminate. Alternatively the catalyst components, the metallocene complex and the aluminate, can bed pre-contacted and then impregnated into the support.

When the catalyst of the invention is a supported particulate catalyst, it comprises 0.01 to 4.0 wt. %, preferably 0.1 to 2.0 wt. % of a transition metal provided by a metallocene complex of the transition metal.

After impregnation or deposition of the metallocene complex and the aluminate into the support, excess solvent is removed by evaporation at elevated temperature.

The catalyst of this invention can be fed to a solution reactor, a slurry reactor or a fluidized bed gas-phase reactor for polymerization and copolymerization of ethylene and alpha-olefins. The temperature of polymerization can range from 25° to 125° C., but more generally between 50° to 115° C., at pressures of less than 10000 psi.

The catalyst can be used, for example, to produce high density polyethylene or linear low density polyethylene which is a copolymer of ethylene and a higher alpha-olefin such as 1-butene, 1-pentene, 1-hexene, 1-octene, 4-methyl-1-pentene, etc.

EXAMPLES

Example 1

Triphenyl carbinol (0.247 g, 0.95 mmol) was dissolved in 3 cc of purified toluene in a 25-cc glass bottle sealed with a rubber septum, and MAO (1.9 mmol, 0.4 cc 4.75 M solution in toluene) was added to it at the [OH groups in carbinol]:[MAO] ratio of 0.5. Vigorous reaction (ca. 5 min at room temperature) with methane evolution (the gas was released from the bottle through a syringe needle) ensued resulting in the formation of orange-colored solution. Based on the known structure of MAO, the reaction product can be described as an oligomer containing units of two types, [—Al(CH₃)—O—] and Al(OCPh₃)—O—]. The ratio between the contents of both groups is determined by the ratio between MAO and the carbinol.

The above-described product was tested as a cocatalyst in combination with a bridged metallocene complex $C_2H_4$(indenyl)$_2$ZrCl$_2$ (0.00029 mmol) under ethylene/1-hexene copolymerization conditions. The copolymerization reaction was carried out in a 500-cc stainless-steel autoclave equipped with a stirrer, a thermocouple, and several ports for adding reaction components. Prior to polymerization, the reactor was purged with nitrogen at 105–110° C. for 1 hour. The copolymerization reaction was carried out at 80° C. in n-heptane (230 cc) as a solvent, at a 0.64 mol/l 1-hexene concentration in solution and at a total reaction pressure of ca. 100 psig. TMA (1.35 mmol) was added to the mixture of the solvent and 1-hexene as an impurity scavenger. The amount of the alkylaluminate cocatalyst (expressed as mmol of Al) was 1.9 mmol and the [Al]:[Zr] ratio was 6550. The reaction produced, over a 30-min period, 26.7 g of an ethylene/1-hexene copolymer containing 4.2 mol. % of 1-hexene with a melt index of 14.0. Catalyst productivity was over 92,000 g PE/mmol Zr.

Example 2

Triphenyl carbinol (0.395 g, 1.54 mmol) was reacted, as described in Example 1, with MAO (1.9 mmol) for 1 hour at the [OH groups in carbinol]:[MAO] ratio of 0.8 to produce an alkylaluminate containing predominantly [—Al(OCPh$_3$)—O—] units. The reaction product was tested in combination with $C_2H_4$(indenyl)$_2$ZrCl$_2$ (0.00029 mmol) in an ethylene/1-hexene copolymerization reaction under conditions of Example 1. The amount of the cocatalyst was 1.9 mmol and the [Al]:[Zr] ratio was 6550. The reaction produced, over a 60-min period, 22.9 g of an ethylene/1-hexene copolymer containing 4.1 mol. % of 1-hexene with a melt index of 14.2. Catalyst productivity was over 79,000 g PE/mmol Zr.

Example 3

Triphenyl carbinol (0.248 g, 0.957 mmol) was dissolved in 3 cc of toluene and was reacted, as described in Example 1, with MAO (1.9 mmol) for 1 hour at the [OH groups in carbinol]:[MAO] ratio of 0.5. The reaction product was mixed with $C_2H_4$(indenyl)$_2$ZrCl$_2$ (0.00147 mmol) at a [Al]:[Zr] ratio of 1290. An aliquot of this mixture containing 0.00098 mmol of the zirconium complex was tested as a single-component catalyst in an ethylene/1-hexene copolymerization reaction under conditions of Example 1. The reaction produced, over a 90-min period, 16.9 g of an ethylene/1-hexene copolymer. Catalyst productivity was 17,200 g PE/mmol Zr.

Example 4

Triphenyl carbinol (0.702 g, 2.7 mmol) was dissolved in 3 cc of TMA (2.7 mmol) solution in heptane for 30 min. Based on known chemistry of reactions between trialkylaluminum compounds and alcohols, formation of dimethylaluminum alkoxide, (CH$_3$)$_2$Al(O—CPh$_3$), is expected in this reaction. Then neat water was added to the solution in two steps, first in an amount of 24 µl (1.35 mmol) for 30 min to achieve an [H$_2$O]:[Al] ratio of 0.5 and apparently to produce methylalkoxydialumoxane (Ph$_3$CO)(CH$_3$)Al—O—Al(CH$_3$)(OCPh$_3$) and then, in the second step, in an amount of 22 µl (1.24 mmol) to reach the total [H$_2$O]:[Al] ratio of 0.9:1 and to produce an alkylaluminate containing predominantly [—Al(OCPh$_3$)—O—] units. The reaction product was tested in combination with $C_2H_4$(indenyl)$_2$ZrCl$_2$ (0.00147 mmol) under reaction conditions of Example 1 at the reaction pressure of 180 psi and at the [Al]:[Zr] ratio of 1860. The reaction produced, over a 120-min period, 15.2 g of an ethylene/1-hexene copolymer containing 2.6 mol. % of 1-hexene. Catalyst productivity was over 10,000 g PE/mmol Zr.

Example 5

Fenchyl alcohol (1,3,3-trimethyl-2-norbornanol, 0.186 g, 1.2 mmol) was dissolved in 5 cc of toluene and was reacted, as described in Example 1, with MAO (2.4 mmol) for 1 hour at the [OH groups in alcohol]:[MAO] ratio of 0.5. The reaction product was tested in combination with $C_2H_4$(indenyl)$_2$ZrCl$_2$ (0.00147 mmol) in an ethylene/1-hexene copolymerization reaction under conditions of Example 1 at the reaction pressure of 180 psi and at the [Al]:[Zr] ratio of 1610. The reaction produced, over a 180-min period, 8.3 g of an ethylene/1-hexene copolymer containing 2.4 mol.% of 1-hexene with a melt index of 34. Catalyst productivity in the polymerization experiment was 5,600 g PE/mmol Zr.

Comparative Example 1

Triphenyl carbinol in an amount of 1.401 g (5.4 mmol) was dissolved in 8 cc of toluene, the solution was flushed with purified nitrogen and slowly added to a 25-cc glass bottle sealed with a rubber septum containing 2.0 cc of 1.35 M solution of TMA in heptane. A vigorous reaction resulted in a rapid methane evolution (the gas was released from the bottle through a syringe needle); the reaction product remained dissolved in toluene. Based on known chemistry of reactions between trialkylaluminum compounds and alcohols, formation of methylaluminum dialkoxide (CH$_3$)Al(O—CPh$_3$)$_2$ is expected in this reaction. The reaction product was tested in combination with $C_2H_4$(indenyl)$_2$ZrCl$_2$ in an ethylene/1-hexene copolymerization reaction under conditions of Example 1 and was found inactive.

Comparative Example 2

Liquid benzyl alcohol in an amount of 0.098 cc (0.95 mmol) was mixed with 3 cc of purified toluene in a 25-cc glass bottle sealed with a rubber septum, and MAO (1.9 mmol, 0.4 cc of 4.75 M solution in toluene) was added to the bottle. The reaction resulted in methane evolution; the reaction product remained in solution. The product was tested in combination with $C_2H_4$(indenyl)$_2$ZrCl$_2$ (0.00029 mmol) in an ethylene/1-hexene copolymerization reaction under conditions of Example 1 and was found inactive.

Comparative Example 3

Liquid 2,2,2-trifluoroethanol in an amount of 0.20 cc (2.7 mmol) was dissolved in 3 cc of purified toluene and was added to a 25-cc glass bottle sealed with a rubber septum and containing TMA (2.7 mmol) in 5 cc of toluene. A vigorous reaction resulted in methane evolution; the reaction product remained in solution. Based on known chemistry of reactions between trialkylaluminum compounds and alcohols, formation of dimethylaluminum alkoxide (CH$_3$)$_2$Al(OCH$_2$CF$_3$) is expected in this reaction. Then neat water was added to the solution in two steps, first in an amount of 24 µl (1.35 mmol) to achieve an [H$_2$O]:[Al] ratio of 0.5 and apparently to produce methylalkoxydialumoxane (CF$_3$CH$_2$O)(CH$_3$)Al—O—Al(CH$_3$)(OCH$_2$CF$_3$) and then, in the second step, in an amount of 22 µl (1.24 mmol) to reach the total [H$_2$O]:[Al] ratio of 0.9:1. The reaction product was tested in combination with $C_2H_4$(indenyl)$_2$ZrCl$_2$ (0.00294 mmol) in an ethylene/1-hexene copolymerization reaction under conditions of Example 1 and was found to have very low activity, ca. 2,700 g/mmol Zr for 170 min.

Comparative Example 4

Triphenyl silanol in an amount of 0.657 cc (2.38 mmol) was dissolved in 8.5 cc of purified toluene in a 25-cc glass bottle sealed with a rubber septum, and MAO (4.75 mmol, solution in toluene) was added to the bottle. The reaction resulted in methane evolution; the reaction product remained in solution. The product was tested in combination with $C_2H_4(indenyl)_2ZrCl_2$ (0.00029 mmol) in an ethylene/1-hexene copolymerization reaction under conditions of Example 1 and was found inactive.

These examples demonstrate that oligoalkylaluminates with sterically hindered alkyl groups derived from various highly sterically hindered carbinols are effective cocatalysts for metallocene complexes in olefin polymerization reactions. Comparative Examples show that neither aluminum dialkoxides formed from the same carbinols (Comparative Example 1), nor alkylaluminates produced from sterically non-hindered alcohols (Comparative Examples 2 and 3) or from silanols (Comparative Example 4) are suitable as cocatalysts for metallocene complexes.

Thus it is apparent that there has been provided, in accordance with the invention a synthesis that fully satisfied the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A catalyst composition for polymerization of alpha-olefins comprising the contact product of a metallocene complex of a transition metal of the formula $$Cp_xMA_yB_z$$

wherein x is 1 or 2; M is titanium, zirconium or hafnium; Cp is a cyclopentadienyl group, a substituted cyclopentadienyl group, a cyclopentadienyl group that is a part of a bicyclic or a tricyclic moiety or, when x is 2, the two cyclopentadienyl groups are optionally bridged to each other; and each of A and B is selected from the group consisting of a halogen atom, a hydrogen atom, an alkyl group, and combinations thereof; providing that x+y+z is equal to the valence of M; and a cocatalyst, alkylaluminate the general formula [—Al(CH$_3$)O]$_p$—[Al(OR)O]$_q$—, wherein R is a sterically hindered alkyl group and the q:p ratio varies from 1:10 to 1:0, said sterically hindered alkyl group containing a trisubstituted aliphatic carbon atom, —CR'R"R'", or a disubstituted aliphatic carbon atom, —CHR'R", where substituents R', R" and R'" are the same or different aliphatic, aromatic or alkylaromatic groups.

2. The catalyst composition of claim 1, wherein x is 2.
3. The catalyst composition of claim 2, wherein M is Zr.
4. The catalyst composition of claim 3, wherein A and B are Cl.
5. The catalyst composition of claim 4, wherein Cp is n-butycyclopentadienyl.
6. The catalyst composition of claim 4 wherein Cp is a tetrahydroindenyl group and where the two tetrahydroindenyl groups are linked by an ethylene bridge.
7. The catalyst composition of claim 4 wherein Cp is an indenyl group and where the two indenyl groups are linked by an ethylene bridge.
8. The catalyst composition of claim 4 wherein Cp is a tetrahydroindenyl group and where the two tetrahydroindenyl groups are linked by a dimethylsilyl bridge.
9. The catalyst composition of claim 1 wherein the sterically hindered alkyl group R in the alkylaluminate is selected from the group consisting of triphenylmethyl, diphenylmethyl and 1,3,3-trimethyl-2-norbornanyl groups.
10. The catalyst composition of claim 1 wherein the q:p ratio is: 1.0.
11. The catalyst composition of claim 1 wherein the q:p ratio is: 0.1.
12. The catalyst component of claim 1, wherein the catalyst composition comprising the contact product of a metallocene complex of a transition metal of the formula $Cp_xMA_yB_z$ and the alkylaluminate with sterically hindered alkyl groups of the formula —[Al(CH$_3$)O]$_p$—[Al(OR)O]$_q$— is supported on an inert porous support.
13. The catalyst composition of claim 1, wherein the alkylaluminate cocatalyst of the formula —[Al(CH$_3$)O]$_p$—[Al(OR)O]$_q$— wherein R is a sterically hindered alkyl group and the p:q ratio varies from 10:1 to 0:1, is produced by reacting alkylalumoxane with a sterically hindered carbinol containing a trisubstituted aliphatic carbon atom or a disubstituted aliphatic carbon atom in the alpha-position to its hydroxyl group, R'R"R'"COH or R'R"HCOH, wherein substituent R', R'" and R'" are the same or different aliphatic, aromatic or alkylaromatic groups; in the amounts required to produce the cocatalysts at the p:q ratios of 10:1 to 0:1.
14. The catalyst composition of claim 13 wherein the sterically hindered carbinol is triphenyl carbinol, diphenyl carbinol, or 1,3,3-trimethyl-2-norbornanol, in the amounts required to produce the cocatalyst at the p:q ratio of 10:1 to 0:1.
15. The catalyst composition of claim 1, wherein the alkylaluminate cocatalyst of the formula [—Al(CH$_3$)O]$_p$—[Al(OR)O]$_q$ is produced in steps comprising (i) reacting trimethylaluminum with a sterically hindered carbinol containing a trisubstituted aliphatic carbon atom or a disubstituted aliphatic carbon atom in the alpha-position to its hydroxy group, R'R"R'"COH or R'R"HCOH, wherein substituent R', R" and R'" are the same or different aliphatic, aromatic or alkylaromatic groups; in the amounts corresponding to the molar [AlMe$_3$]:[carbinol] ratio from 2:1 to 1:1; (ii) reacting the product of step (i) with water at the molar [Al]:[H$_2$O] ratio of 1:1 to 2:1.
16. The catalyst composition of claim 15 wherein the sterically hindered carbinol is triphenyl carbinol, diphenyl carbinol, or 1,3,3-trimethyl-2-norbornanol.

* * * * *

UNITED STATES PATENT AND TRADEMARK OFFICE
CERTIFICATE OF CORRECTION

PATENT NO. : 6,015,766
DATED : January 18, 2000
INVENTOR(S) : Yury V. Kissin

It is certified that error appears in the above-identified patent and that said Letters Patent is hereby corrected as shown below:

Column 8, line 17, after "1.0" insert --:1.0--.

Column 8, line 19, after "0.1" insert --:1.0--.

Column 8, line 34, R''', first occurrence, should read --R"--.

Column 8, line 52, "[AlMe$_3$]" should read --[AlR$_3$]--.

Signed and Sealed this

Twenty-eighth Day of November, 2000

Attest:

Q. TODD DICKINSON

*Attesting Officer*  *Director of Patents and Trademarks*